3,486,948
REGENERATING COMPOSITION FOR
SOLDERING IRONS
Gunther Laubmeyer and Marius Smits, both of
73 Bahnhofstrasse, Arolsen-Waldeck, Germany
Filed Feb. 15, 1967, Ser. No. 616,333
Claims priority, application Germany, Feb. 16, 1966,
Z 12,032
Int. Cl. B23k 35/34
U.S. Cl. 148—24                      2 Claims

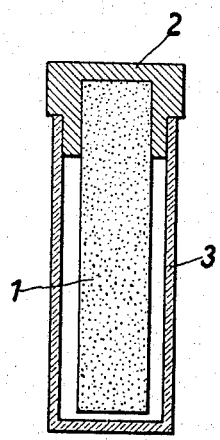

ABSTRACT OF THE DISCLOSURE

For restoring the wettability of soldering irons, a mixture is used which consists of sodium ammonium hydrogen phosphate, powdered soldering metal, and powdered abrasive, and which is impregnated with rosin.

---

This invention relates to regenerating agents for the tips of soldering irons.

For manual or machine soft soldering with electrically heated soldering irons, there are used frequently irons with specially protected tips to avoid the strong wear of the conventional copper bits. Such wear and erosion resistant irons have inserts or tips of copper which have been plated with coatings of Ni, Fe, Cr, or other heavy metals.

At work places where soldering is done only occasionally or where extensive intermissions, including lunch hours, interrupt the work, the wetting power of such tips with the liquid solder is decreased due to oxidation of the iron, nickel, or other coating of the copper tip. Not infrequently, said wetting ability is reduced to zero. In such condition, the valuable "iron" tip had to be discarded heretofore.

It is a principal object of the invention to provide means to render such long lasting tips fully re-usable.

Other objects and advantages will become apparent from a consideration of the specification and claims.

In accordance with the invention, the wetting ability of a permanent soldering tip is restored by treatment with a regenerating agent of the following composition:

| | Percent by weight |
|---|---|
| Sodium ammonium hydrogen phosphate (Na(NH$_4$)HPO$_4$) | 10–80 |
| Powdered solder | 5–30 |
| Powdered abrasive | 5–25 |

As powdered solder, we use conventional solder, e.g., a solder composed of 60 percent by weight of tin and 40 percent by weight of lead. The powdery mixture of the regenerating agent is pressed into suitable forms such as rods, tablets, or blocks. Prior to the compression, the normal water content of the sodium-ammonium-hydrogen phosphate, which is 4H$_2$O, should be reduced by drying, preferably to a content of about 2H$_2$O.

Subsequently, the shaped body is impregnated with a resin, preferably a resin which acts as a non-corrosive flux, for instance with an alcoholic rosin solution. This solution permeates the entire mass and renders the compressed mixture non-hygroscopic.

The drawing shows by way of example the composition of the invention in a convenient form for use.

The resin-impregnated composition is compressed to a cylindrical stick 1 and secured in a recess of a stopper 2 of a protecting tube 3. The stopper 2 serves as handle when the stick is used.

When, after having been out of service for an extended period of time, a soldering iron does not accept solder, it is rubbed in the hot state several times with such regenerating stick.

It is also possible to fill a box with the regenerating composition and to dip the hot soldering tip into the composition, whereby the tip can be gently moved to and fro in the molten regenerating composition. After such treatment, the soldering iron is again ready for use.

When our novel regenerating composition is applied to soldering tips which have an electrolytic coating of the recited heavy metals such as Fe, Ni, Cr, or which consist of such metals, various coacting reactions take place. The abrasive component which consists of a suitable abrasive, emery, or hard mixed crystals, removes the outer oxidation layer. The molten phosphate component dissolves the residual oxides, and the solder particles exert at the same time a wetting effect so as to produce a very fast complete tinning. In this way, expensive permanent copper pieces can be rendered reusable by a quick, simple, and unexpensive treatment.

Instead of the sodium ammonium hydrogen phosphate similar phosphates, particularly meta- and meta-polyphosphates, can be employed.

The abrasives used, such as aluminum oxide or carborundum are granular, the grain size corresponding to a mesh size between 120–170, preferably 140 ASAZ: Jan. 23, 1961. The preferred grain size is about 0.1 mm.

The rosin solution to be used is a solution of 100–150 g. solids in 1000 ccm. alcohol. The solids used are rosin or any activated rosin. Thus the solution is one containing about 10–15 parts by weight of solids.

The shaped body is wetted by, or preferably immersed in, the solution. The body absorbs the solution. Upon withdrawal from the solution the alcohol evaporizes. After evaporation of the alcohol all grains of the shaped body are enclosed by the rosin as a lacquer-like protective coating.

The invention will now be described by reference to the following example.

EXAMPLE 45 parts by weight of sodium ammonium hydrogen phosphate which by a dehydrating process contains only about two molecules of water of crystallization instead of four, 50 parts by weight of a powdered soldering metal comprising an alloy of 60 parts by weight of tin and 40 parts by weight of lead and 5 parts by weight of an emery or abrasive powder of aluminum oxide, said powder having a grain size of 0.1 mm., are intimately mixed in a mechanical mixer. This mixture is pressed into bodies of a shape as shown in the accompanying drawing at room temperature, applying a pressure between 2.500–3.000 kg./cm.$^2$, the pressure being exerted by an eccentric press. Subsequently, the shaped bodies are immersed in a solution of 100 to 150 g. rosin in 1000 ml. methyl alcohol for a time sufficient for the shaped body to be completely impregnated by the alcoholic rosin solution. Thereafter the shaped bodies are dried at room temperature, the alcohol evaporizing.

We claim:

1. A composition for restoring the wettability of soldering irons consisting essentially of a mixture of 10 to 80% by weight of a sodium phosphate selected from sodium ammonium hydrogen phosphate containing less than 4 moles H$_2$O, sodium metaphosphate and sodium metapolyphosphate, 5 to 50% by weight of a powdered tin-lead alloy solder and 5 to 25% by weight of an abrasive selected from emery, carborundum and aluminum oxide and having a grain size between 120 and 170 mesh, said mixture being impregnated with an alcoholic solution containing 10 to 15 parts by weight of a flux selected from rosin and activated rosin.

2. The composition as claimed in claim 1 wherein said mixture is compressed into a shaped form prior to being impregnated with the alcoholic flux solution.

References Cited
UNITED STATES PATENTS

| | | | |
|---|---|---|---|
| 2,144,425 | 1/1939 | Cook | 148—22 |
| 2,452,995 | 11/1958 | Cinamon | 148—22 |
| 3,156,041 | 11/1964 | Gault | 29—496 |
| 2,987,817 | 6/1961 | Kozlink | 29—496 |

HYLAND BIZOT, Primary Examiner

T. R. FRYE, Assistant Examiner

U.S. Cl. X.R.

148—26